(12) United States Patent
Swamidason et al.

(10) Patent No.: US 11,472,464 B2
(45) Date of Patent: *Oct. 18, 2022

(54) BODY MOUNTED SLIDING STEERING COLUMN WITH OFFSET FEEDBACK ACTUATOR

(71) Applicant: NIO Technology (Anhui) Co., Ltd., Anhui (CN)

(72) Inventors: Sai Maharaja Swamidason, Santa Clara, CA (US); Aaron R. Bailey, Mountain View, CA (US); Martin J. McKeefery, San Jose, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,102

(22) Filed: Feb. 23, 2021

(65) Prior Publication Data

US 2021/0171089 A1 Jun. 10, 2021

Related U.S. Application Data

(60) Continuation of application No. 16/719,389, filed on Dec. 18, 2019, now Pat. No. 10,926,787, which is a
(Continued)

(51) Int. Cl.
*B62D 1/183* (2006.01)
*B62D 1/185* (2006.01)
(Continued)

(52) U.S. Cl.
CPC .............. *B62D 1/183* (2013.01); *B60K 35/00* (2013.01); *B60K 37/06* (2013.01); *B62D 1/181* (2013.01);
(Continued)

(58) Field of Classification Search
CPC ........ B62D 1/183; B62D 1/181; B62D 1/185; B62D 6/008; B62D 1/04
See application file for complete search history.

(56) References Cited

U.S. PATENT DOCUMENTS 1,369,259 A 2/1921 Moore
2,331,996 A 10/1943 Maurer
(Continued)

FOREIGN PATENT DOCUMENTS

GB 2184213 6/1987

OTHER PUBLICATIONS

International Search Report and Written Opinion for International (PCT) Patent Application No. PCT/US2018/039412, dated Aug. 28, 2018 8 pages.
(Continued)

*Primary Examiner* — Faye M Fleming
(74) *Attorney, Agent, or Firm* — Sheridan Ross P.C.

(57) ABSTRACT

A steering apparatus for a vehicle that utilizes steer-by-wire controls and may selectively be operated in an autonomous mode comprises a body mounted sliding steering column. The body mounted sliding steering column includes an arm that slides between a stowed position and a use position on at least one rail attached to a frame of the vehicle. The arm supports a steering column that may also be adjustable between a retracted position and an extended position. The arm also houses a force feedback motor in force-transmitting communication with the steering column.

20 Claims, 14 Drawing Sheets

Related U.S. Application Data division of application No. 15/647,055, filed on Jul. 11, 2017, now Pat. No. 10,556,614.

(51) Int. Cl.

| | |
|---|---|
| *B62D 6/00* | (2006.01) |
| *B62D 1/04* | (2006.01) |
| *B62D 1/181* | (2006.01) |
| *B62D 5/00* | (2006.01) |
| *B62D 25/14* | (2006.01) |
| *B60K 35/00* | (2006.01) |
| *B60K 37/06* | (2006.01) |

(52) U.S. Cl.
CPC ............ *B62D 1/185* (2013.01); *B62D 5/006* (2013.01); *B62D 6/008* (2013.01); *B62D 25/14* (2013.01); *B60K 2370/158* (2019.05); *B60K 2370/782* (2019.05); *B62D 1/04* (2013.01)

(56) References Cited

U.S. PATENT DOCUMENTS

| | | |
|---|---|---|
| 3,580,352 A | 5/1971 | Hestad et al. |
| 5,044,956 A | 9/1991 | Behensky et al. |
| 5,101,751 A | 4/1992 | Kobayashi |
| 5,152,627 A | 10/1992 | Arnold |
| 5,187,997 A | 2/1993 | Henry-Moore |
| 5,199,319 A | 4/1993 | Fujiu |
| 5,449,199 A | 9/1995 | Heinrichs et al. |
| 5,509,324 A | 4/1996 | Cymbal |
| 5,906,543 A | 5/1999 | Jones |
| 6,390,505 B1 | 5/2002 | Wilson |
| 6,942,057 B2 | 9/2005 | Boloorchi et al. |
| 6,997,281 B2 | 2/2006 | Chernoff et al. |
| 7,191,679 B2 | 3/2007 | Tomaru et al. |
| 7,275,767 B2 | 10/2007 | Appleyard |
| 7,530,422 B2 | 5/2009 | Boloorchi et al. |
| 7,628,244 B2 | 12/2009 | Chino et al. |
| 7,975,569 B2 | 7/2011 | Klos |
| 8,650,983 B2 | 2/2014 | Mizuno et al. |
| 8,899,623 B2 | 12/2014 | Stadler et al. |
| 8,994,521 B2 | 3/2015 | Gazit |
| 9,333,983 B2 | 5/2016 | Lathrop et al. |
| 9,764,756 B2 | 9/2017 | Sugioka et al. |
| 10,029,724 B2 | 7/2018 | Lubischer et al. |
| 10,029,725 B2 | 7/2018 | Schulz et al. |
| 10,099,717 B2 | 10/2018 | Shiina |
| 10,457,314 B2 | 10/2019 | Swamidason |
| 10,556,614 B2 | 2/2020 | Swamidason et al. |
| 10,926,787 B2 * | 2/2021 | Swamidason .......... B60K 35/00 |
| 2002/0088296 A1 | 7/2002 | Schroter et al. |
| 2003/0146037 A1 | 8/2003 | Menjak et al. |
| 2006/0001249 A1 | 1/2006 | Fargeas et al. |
| 2006/0125224 A1 | 6/2006 | Higashino et al. |
| 2008/0035438 A1 | 2/2008 | Valembois |
| 2008/0105182 A1 | 5/2008 | Luxford |
| 2009/0085338 A1 | 4/2009 | Tanaka et al. |
| 2011/0153160 A1 | 6/2011 | Kesseling |
| 2013/0110353 A1 | 5/2013 | Tanaka et al. |
| 2016/0347347 A1 | 12/2016 | Lubischer et al. |
| 2016/0362126 A1 | 12/2016 | Lubischer et al. |
| 2017/0029018 A1 | 2/2017 | Lubischer et al. |
| 2017/0158227 A1 | 6/2017 | Katzourakis et al. |
| 2018/0072339 A1 | 3/2018 | Bodtker |
| 2018/0154932 A1 | 6/2018 | Rakouth et al. |
| 2018/0208235 A1 | 7/2018 | Maiyashita |
| 2018/0237051 A1 | 8/2018 | von Freyberg et al. |
| 2018/0347635 A1 | 12/2018 | Kim |

OTHER PUBLICATIONS

International Preliminary Report on Patentability for International (PCT) Patent Application No. PCT/US2018/039412, dated Jan. 9, 2020 7 pages.
Official Action for U.S. Appl. No. 15/633,469, dated Nov. 6, 2018 12 pages.
Official Action for U.S. Appl. No. 15/633,469, dated Mar. 22, 2019 13 pages.
Notice of Allowance for U.S. Appl. No. 15/633,469, dated Jun. 12, 2019 5 pages.
Official Action for U.S. Appl. No. 15/647,055, dated Nov. 19, 2018 6 pages.
Official Action for U.S. Appl. No. 15/647,055, dated Apr. 4, 2019 5 pages.
Notice of Allowance for U.S. Appl. No. 15/647,055, dated Sep. 13, 2019 5 pages.
Official Action for U.S. Appl. No. 16/719,389, dated Apr. 2, 2020 8 pages.
Final Action for U.S. Appl. No. 16/719,389, dated Sep. 4, 2020 6 pages.
Notice of Allowance for U.S. Appl. No. 16/719,389, dated Oct. 2, 2020 5 pages.
Corrected Notice of Allowance for U.S. Appl. No. 16/719,389, dated Oct. 6, 2020 4 pages.

* cited by examiner

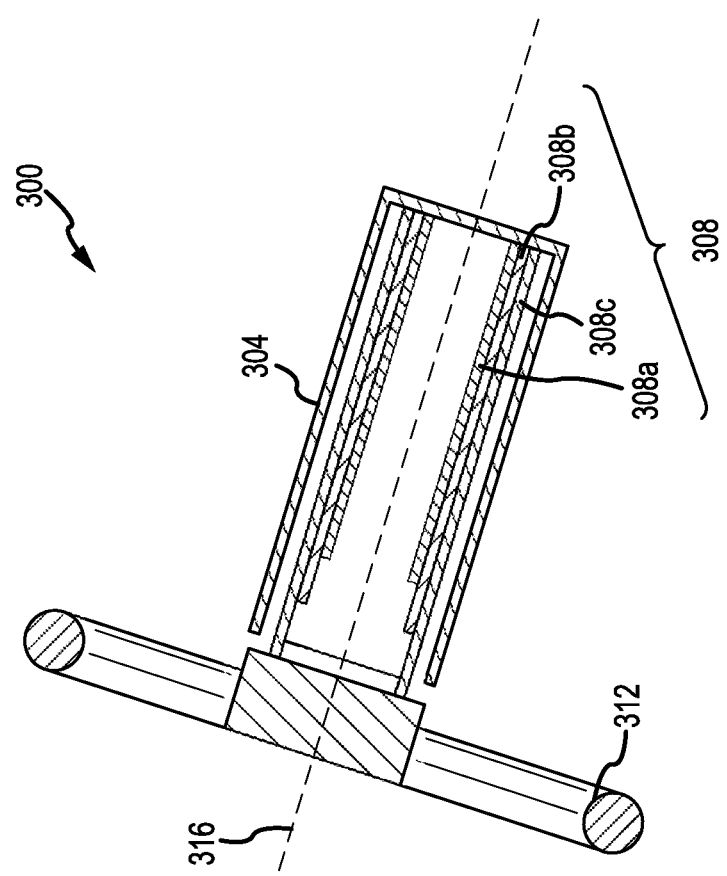

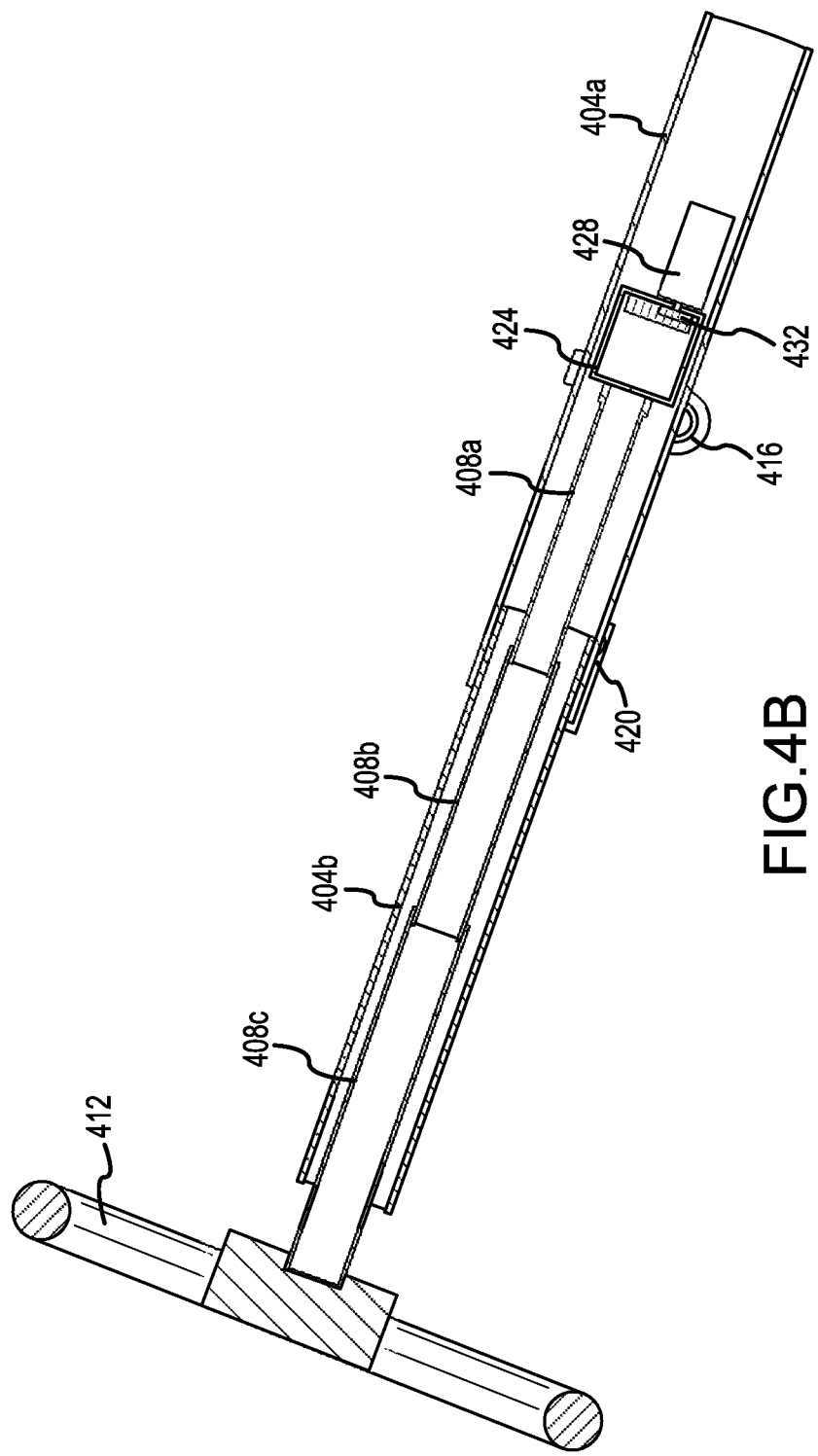

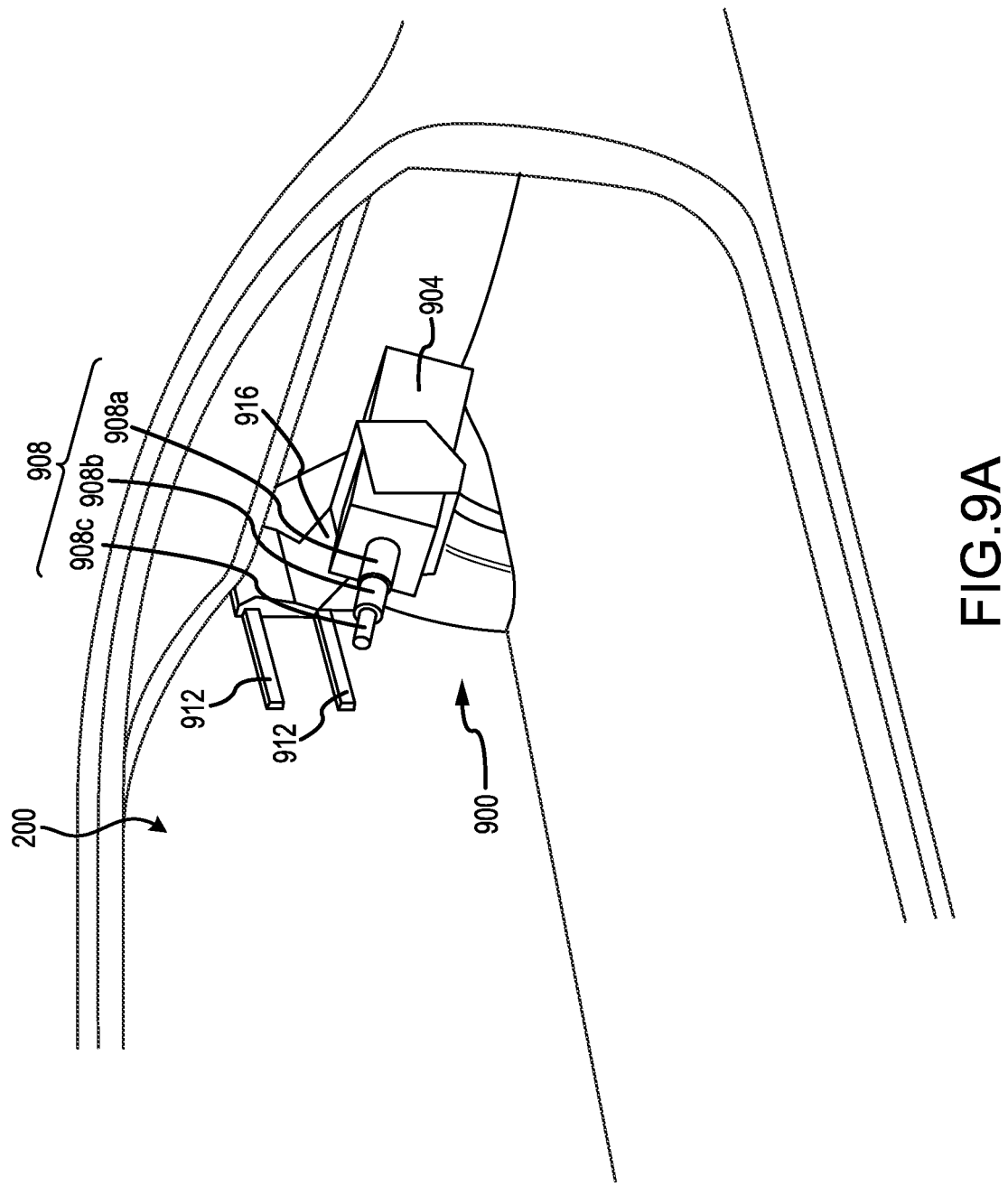

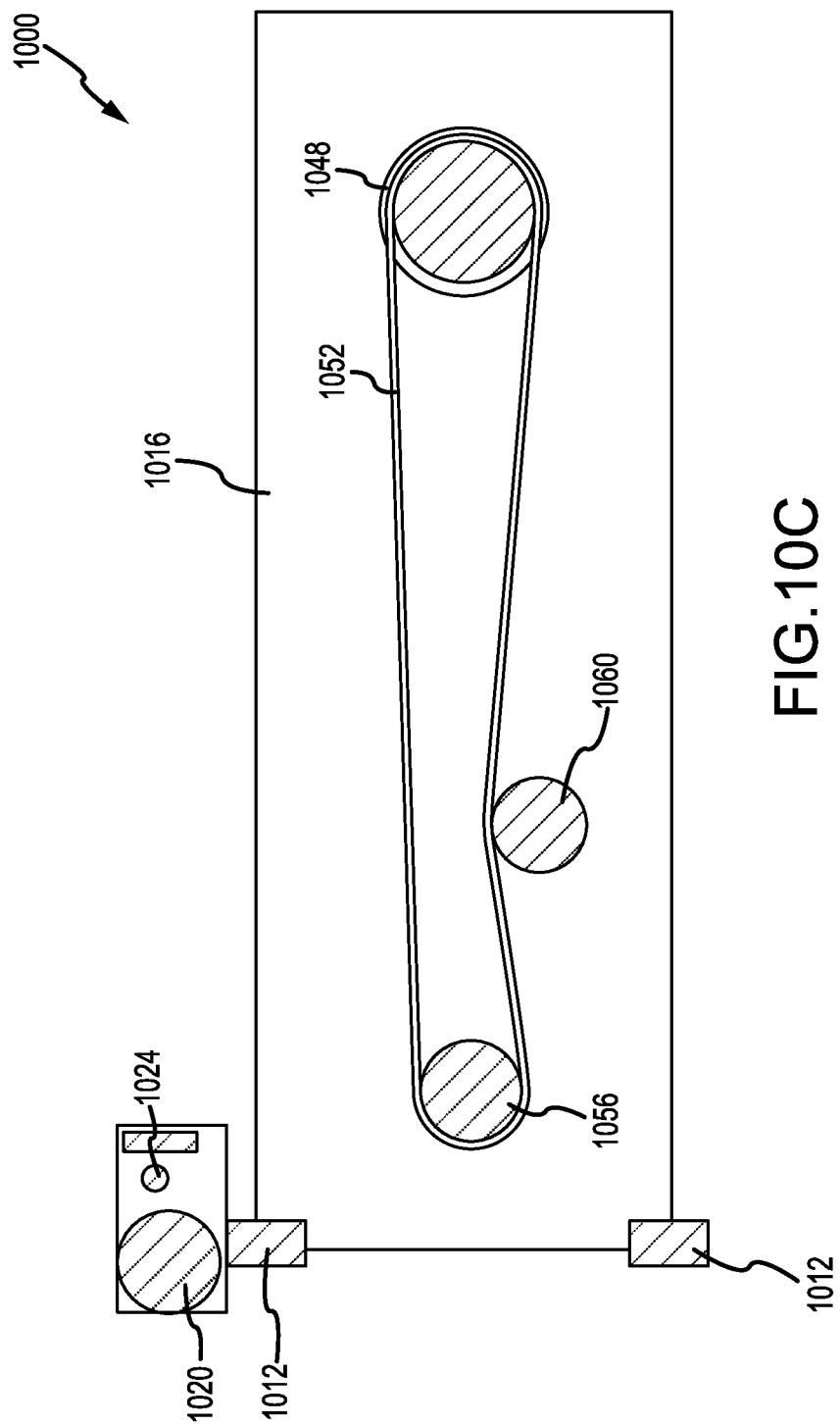

BODY MOUNTED SLIDING STEERING COLUMN WITH OFFSET FEEDBACK ACTUATOR

CROSS REFERENCE TO RELATED APPLICATIONS

The present application is a continuation of and claims the benefits of and priority to U.S. patent application Ser. No. 16/719,389, filed on Dec. 18, 2019, of the same title, which is a division of and claims the benefits of and priority to U.S. patent application Ser. No. 15/647,055, filed on Jul. 11, 2017, of the same title, the entire disclosures of which are each hereby incorporated herein by reference, in their entireties, for all that they teach and for all purposes.

FIELD

The present disclosure is generally directed to vehicle systems, and more particularly to vehicle steering systems.

BACKGROUND

Steerable vehicles, including cars, trucks, and buses, often include a steering wheel positioned in front of a driver's seat. Such steering wheels are traditionally mounted on a steering column, which is mechanically connected to the vehicle's road wheels. When the steering wheel is turned, the steering column also turns, and through the mechanical linkage causes the road wheels to rotate. Steering wheels and the columns that support them are often fixed, although in some instances the steering wheel can be tilted up or down to accommodate drivers of different heights. In some vehicles, the steering column may have an adjustable length, so that the steering wheel can be lengthened or shortened, again to accommodate persons of different physiological makeup. Notably, the total travel length of known adjustable steering columns is approximately eighty millimeters or less. Many vehicles, including both those that do and those that do not have adjustable steering wheels, utilize an adjustable driver's seat to compensate for the relatively small range of adjustability in the position of the steering wheel.

U.S. Pat. No. 8,899,623, entitled "Motor Vehicle with Retractable Steering Wheel" and filed on Jul. 25, 2012, describes a vehicle with a steering wheel arranged on a steering column and configured to move from an extended position, where the steering wheel is available for use in steering the vehicle, to a retracted position, in which the steering wheel is stowed during autonomous driving. U.S. Published Patent Application No. 2013/0110353, entitled "Controller for Steering Apparatus" and filed on Oct. 16, 2012, describes a controller for a powered steering wheel tilting mechanism. The controller detects the tilting angle of the steering apparatus based on a rotational angle of a screw shaft that is driven by an electric motor, and adjusts the current provided to the motor based on the tilting angle. Both of these references are incorporated herein in their entirety.

BRIEF DESCRIPTION OF THE DRAWINGS

FIG. 3A shows a telescoping steering column according to one embodiment of the present disclosure, in a retracted position;

FIG. 4B shows the telescoping steering column of FIG. 4A, in an extended position;

FIG. 9A depicts a body mounted sliding steering column according to another embodiment of the present disclosure in a first position;

FIG. 10C depicts a cross-section of the body mounted sliding steering column of FIG. 10C along the line B-B.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
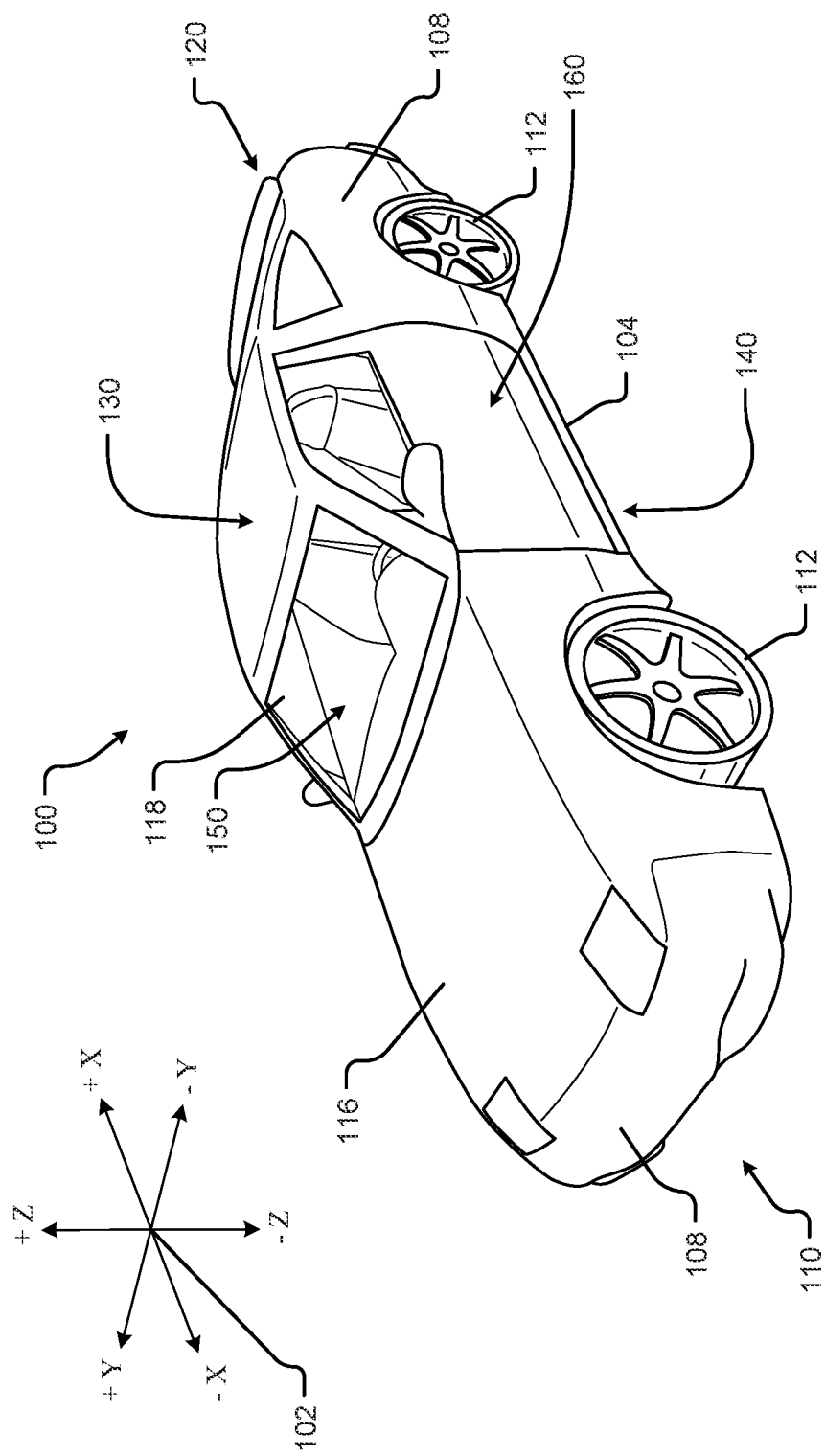
FIG. 1 shows a vehicle in accordance with embodiments of the present disclosure.

FIG. 1 shows a perspective view of a vehicle 100 in accordance with embodiments of the present disclosure. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, an electric vehicle or a gas-powered vehicle. Where the vehicle 100 is an electric vehicle, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is a gas-powered vehicle, the vehicle 100 may comprise a gas-powered engine and associated components in the front compartment (under the vehicle hood 116), which engine may be configured to drive either or both of the front road wheels 112 and the rear road wheels 112. In some embodiments where the vehicle 100 is gas-powered, the gas-powered engine and associated components may be located in a rear compartment of the vehicle 100, leaving the front compartment available for storage or trunk space or for other uses. In some embodiments, the vehicle 100 may be, in addition to a battery-powered electric vehicle and a gas-powered vehicle, a hybrid electric vehicle, a diesel-powered vehicle, or a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

Figure 2:
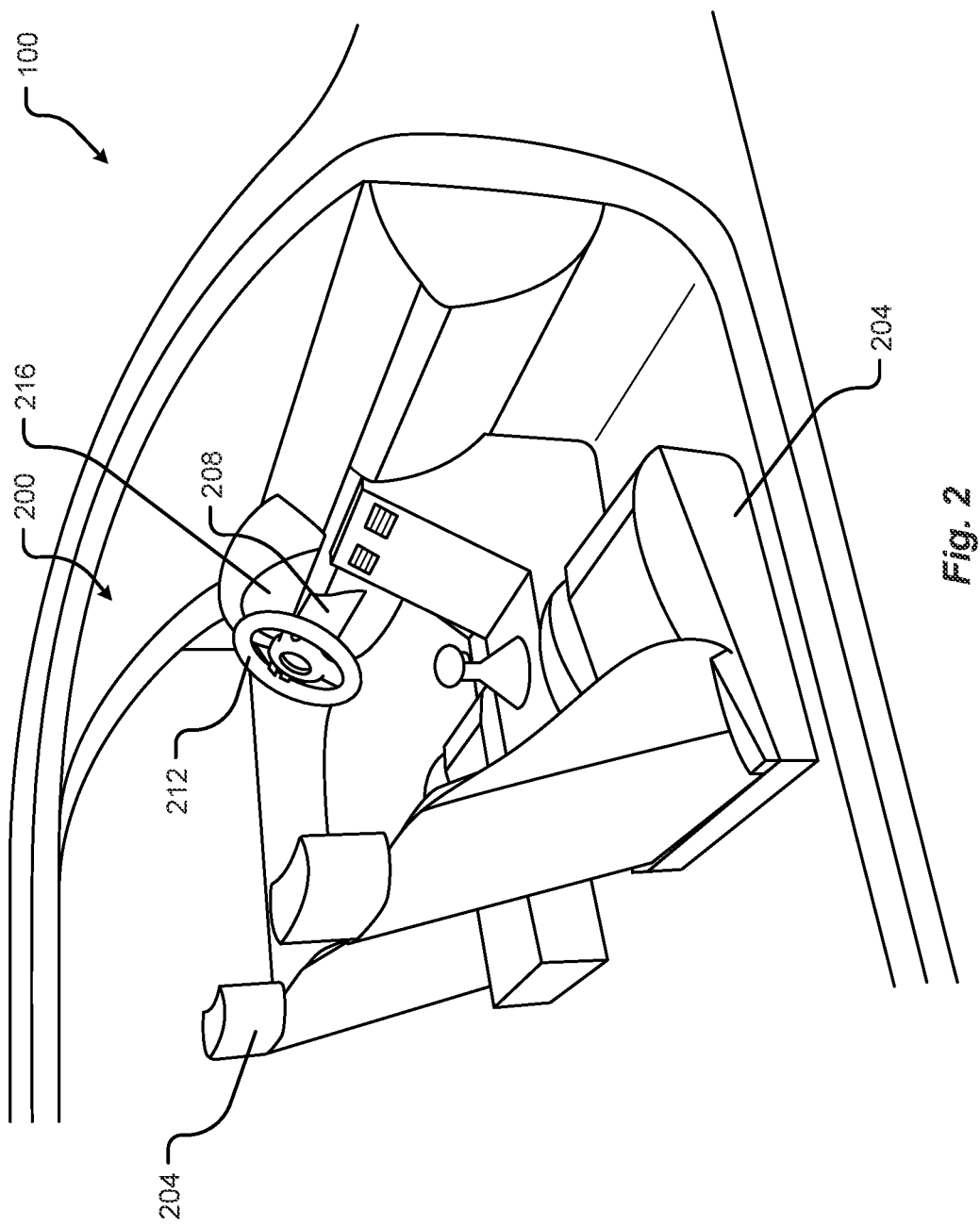
FIG. 2 shows a passenger cabin of a vehicle such as the vehicle shown in FIG. 1 in accordance with embodiments of the present disclosure.

Referring now to FIG. 2, a vehicle passenger cabin 200 of the vehicle 100 according to some embodiments of the present disclosure may include one or more passenger seats 204, a steering column 208 operably connected to and supporting a steering wheel 212, and an instrument panel 216. In embodiments of the present disclosure, the steering wheel 212 and the steering column 208 are part of a steer-by-wire system, which may use a system of sensors and motors, rather than an actual mechanical linkage, to move the road wheels 112 of the vehicle 100 based on inputs from the steering wheel 212. More specifically, one or more sensors connected to the steering wheel 212 and/or the steering column 212 detect parameters such as the degree of rotation of the steering wheel 212 and/or the steering column 208, the rate of rotation of the steering wheel 212 and/or the steering column 208, and/or the rotational acceleration or deceleration of the steering wheel 212 and/or the steering column 208, and transmit this information to a controller (not shown) which may include, for example, a processor. Based on the received information, the controller sends signals to one or more electric motors in mechanical, force-transmitting communication with the road wheels 112 of the vehicle 100, which signals cause the electric motors to operate and cause the road wheels 112 to move in a way that corresponds with the sensed movement of the steering wheel 212. Thus, for example, if a driver of the vehicle 100 turns the steering wheel 212 slowly, the controller will command the electric motor(s) in force-transmitting communication with the road wheels 112 to turn slowly, in the same direction as the steering wheel 212. If the driver of the vehicle 100 jerks the steering wheel to one side (e.g., to avoid an obstacle), the controller will command the electric motor(s) in force-transmitting communication with the road wheels 112 to turn rapidly, with a movement that corresponds to the movement of the steering wheel.

The vehicle 100 may be capable of autonomous operation, wherein one or more processors receive information from various sensors around the vehicle and use that information to control the speed and direction of the vehicle 100 so as to avoid hitting obstacles and to navigate safely from an origin to a destination. In such embodiments, the steering wheel 212 is unnecessary, as the one or more processors, rather than a vehicle occupant, control the steering of the vehicle 100. Embodiments of the present disclosure are particularly suited for optionally autonomous vehicles, where a vehicle occupant may selectively drive the vehicle 100 or activate autonomous navigation of the vehicle 100. In such embodiments, the steering wheel 212 is necessary only when the vehicle occupant is driving the vehicle 100. During autonomous operation, it would be preferable to remove the steering wheel 212 from its position in the passenger cabin 200, to give the vehicle occupant sitting in the driver's seat more room.

Referring now to FIG. 3A, a retractable telescopic steering column 300 according to one embodiment of the present disclosure, shown here in a cross-sectional view, comprises a column housing 304, telescoping column sections 308a, 308b, and 308c, and a steering wheel 312. For descriptive purposes, the ends of the telescoping column sections 308a, 308b, and 308c that are closest to the steering wheel 312 are referred to herein as the proximate ends, and the ends of the telescoping column sections 308a, 308b, and 308c that are farthest from the steering wheel 312 are referred to herein as the distal ends. The column housing 304 may be mounted to a fixed support (not shown). The sensors necessary for steer-by-wire functionality may be attached to any part of the steering column 308. The telescoping column section 308a is rotatably connected to the column housing 304. The telescoping column sections 308b and 308c, meanwhile, are slidably, but not rotatably, engaged with or mounted on the telescoping column sections 308a and 308b, respectively, allowing the steering wheel to extend and retract along central axis 316 of the retractable telescopic steering column 300.

Figure 3B:
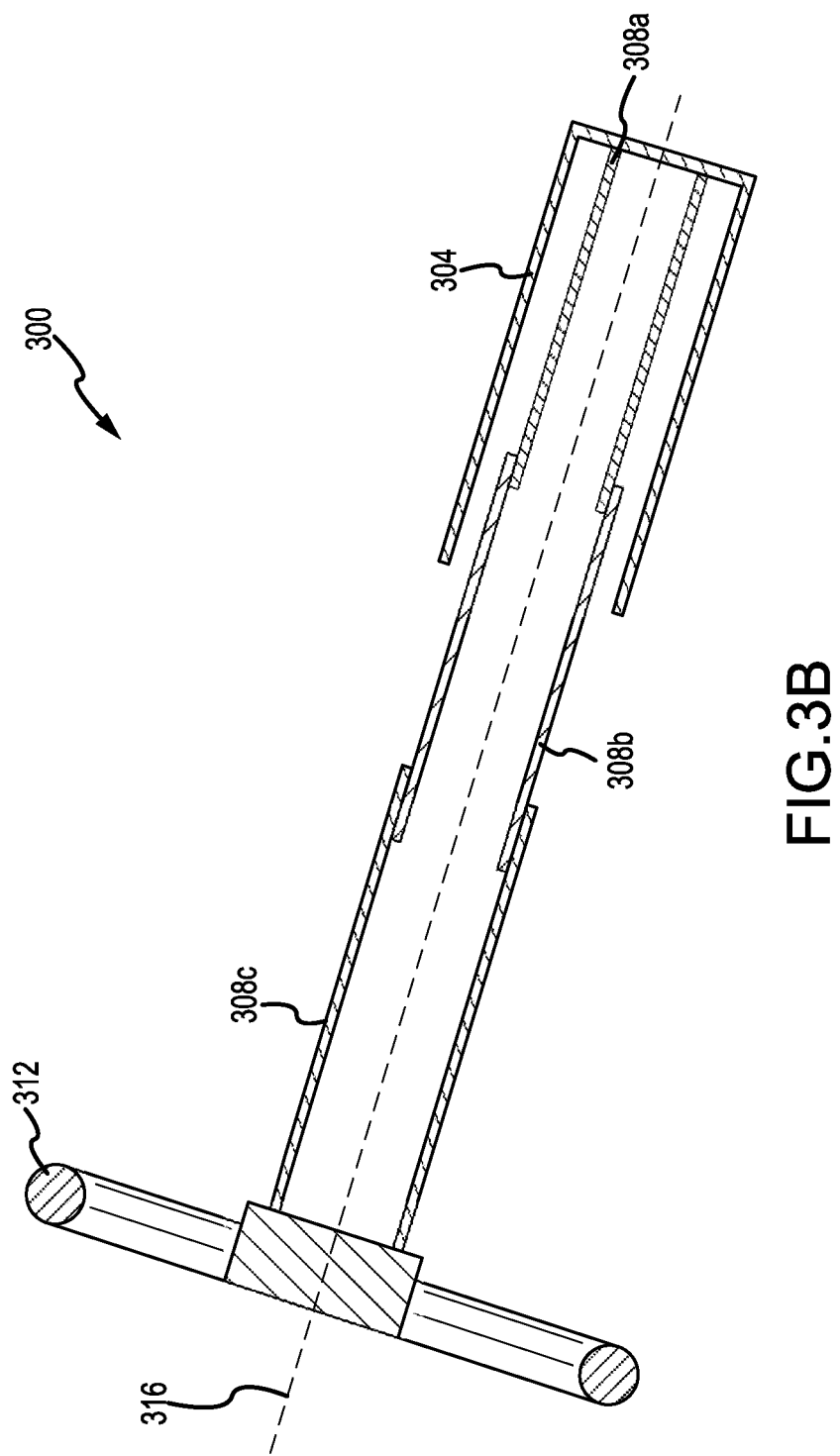
FIG. 3B shows the telescoping steering column of FIG. 3A, in an extended position.

Referring now to FIG. 3B, the retractable telescopic steering column 300 is shown in an extended position. Here, the distal end of the telescoping column section 308b overlaps the proximal end of the telescoping column section 308a, and the distal end of the telescoping column section 308c overlaps the proximal end of the telescoping column section 308b. In this configuration, the steering wheel 312 is extended up to approximately 300 mm (e.g., between 270 and 330 mm) or more from its retracted position as shown in FIG. 3A. In other words, each of the telescoping column sections 308b and 308c are, in at least some embodiments, able to slide approximately 150 mm (e.g., between 135 mm and 165 mm) along the telescoping column sections 308a and 308b, respectively.

Various mechanisms may be used to prevent the telescoping column sections 308 from extending too far and disengaging from each other. For example, in some embodiments, one or more keys or splines might extend radially outward from the distal ends of the telescoping column sections 308a and 308b. The keys or splines might be received by a slot extending axially along a majority of the inside length of the telescoping column sections 308b and 308c, respectively. Then, as the telescoping column sections 308b and 308c slide over the telescoping column sections 308a and 308b, respectively, the keys or splines of sections 308a and 308b slide along the slots of the sections 308b and 308c, respectively, until the keys or splines reach the end of the slots and halt further extension of the sections 308b and 308c. In some embodiments, the slots are positioned in the sections 308a and 308b, and the keys are positioned at the distal ends of sections 308b and 308c, which configuration also prevents overextension of the telescopic column sections 308b and 308c.

As another example, the outer circumference of the proximal ends of the sections 308a and 308b may be larger than the outer circumference along the remainder of the sections 308a and 308b, and the inner circumference of the distal ends of the sections 308b and 308c may be smaller than the inner circumference along the remainder of the sections 308b and 308c. As a result, only the proximal ends of the sections 308a and 308b may contact the outer surface of the sections 308b and 308c, respectively, and only the distal ends of the sections 308b and 308c may contact the outer surface of the sections 308a and 308b, respectively, which may advantageously reduce the sliding friction between the sections 308a, 308b, and 308c. When the sections 308b and 308c are extended along the sections 308a and 308b, respectively, the distal ends of the sections 308b and 308c will eventually contact the proximal ends of the sections 308a and 308b, respectively, thus preventing further extension.

Figure 4A:
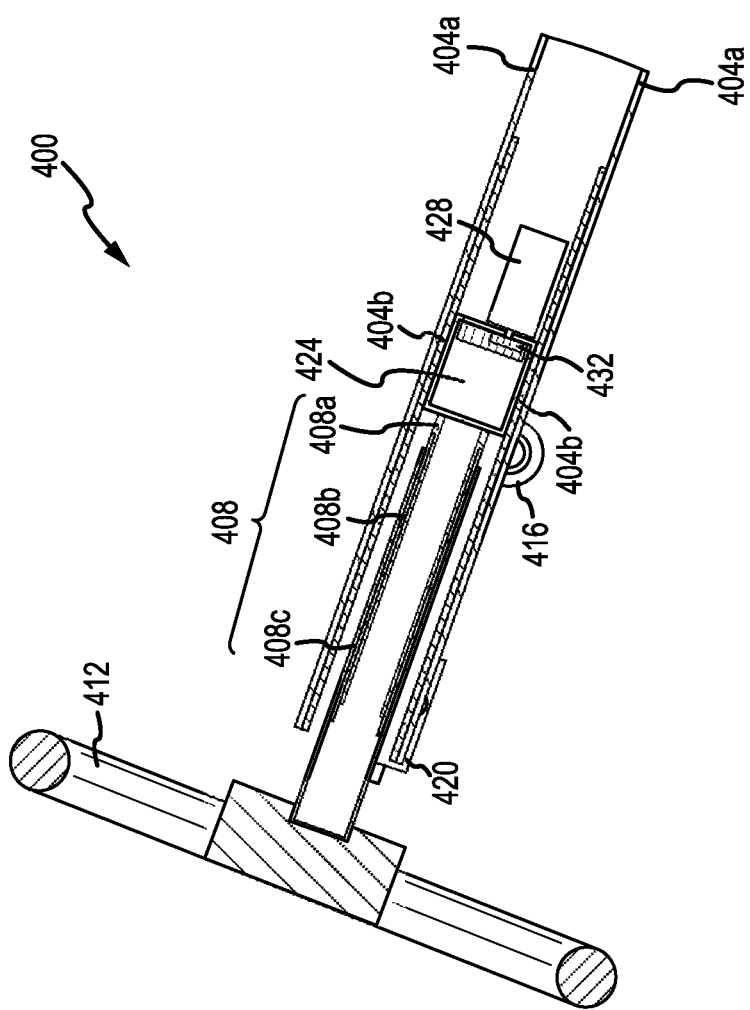
FIG. 4A shows a telescoping steering column according to another embodiment of the present disclosure, in a retracted position.

Turning now to FIG. 4A, a retractable telescopic steering column 400 according to another embodiment of the present disclosure comprises three telescoping column sections 408a, 408b, and 408c, arranged in the same manner as the telescoping column sections 308a, 308b, and 308c of the retractable telescopic steering column 300. Additionally, the telescoping column section 408c is fixedly connected to a steering wheel 412, so that rotational movement of the steering wheel 412 causes rotational movement of the telescoping column section 408c. The column 400 also comprises a two-piece telescoping housing 404, comprising a stationary housing member 404a and an extendable housing member 404b.

Rotatably mounted within the stationary housing member 404a is a feedback assembly 424, comprising a feedback motor 428 driving a planetary gear assembly 432. When the feedback motor 428 is activated, it exerts a rotational force on the telescoping column section 408a, which is transmitted through the telescoping column sections 408b and 408c to the steering wheel 412. A controller (not shown) controls the operation of the feedback motor 428, and is configured to cause the feedback motor 428 to transmit to the user of the steering wheel 412 forces that are the same as or similar to the forces the user would feel if the steering wheel 412 were connected to the road wheels 112 of the vehicle 100 via a mechanical linkage, rather than controlling the road wheels 112 via a steer-by-wire system. The controller may determine the timing, direction (e.g., clockwise or counterclockwise), and/or magnitude of forces to cause the motor 428 to exert on the telescoping column section 408a (and thus to be transmitted to the steering wheel 412 via the telescoping column sections 408b and 408c) based on one or more of internal programming, information about the speed of the vehicle 100, information about the user's movement of the steering wheel 412 (which may be the same information input to the steer-by-wire system), information about the movement of the road wheels 112 of the vehicle 100, whether due to the user's manipulation of the steering wheel 412 or due to external forces (e.g., forces caused by hitting a pothole or a speedbump), and/or information about the amount of force that the steer-by-wire system must cause or is causing to be applied to the road wheels 112 to turn them in a desired direction. Other factors may also be considered or utilized to generate realistic force feedback.

Although the feedback motor 428 is depicted in FIG. 4 as driving a planetary gear assembly 432, the feedback motor 428 may be in force-transmitting communication with the telescoping column sections 408a, 408b, and 408c via any suitable mechanism, including via other types of gear assemblies and via a belt.

Mounted externally to the retractable telescopic steering column 400 are a tilt control motor 416 and an extension/retraction motor 420. The tilt control motor allows for electronic control of the tilt of the steering wheel 412 (and thus of the entire retractable telescopic steering column 400), such that the angle of the steering wheel 412 and the column 400 relative to a horizontal plane can be adjusted. The extension/retraction motor 420 allows the retractable telescopic steering column to be extended and retracted automatically. The extension and retraction motor 420 may operate based on input from a driver of the vehicle 100 via a button, switch, or other user interface. Additionally or alternatively, the extension and retraction motor 420 may operate under the control of a controller or processor executing instructions stored in memory. For example, instructions stored in memory may cause the controller or processor to cause the retraction motor 420 to retract the steering column 400 when the vehicle 100 is placed into, or enters, an autonomous driving mode, and/or when the vehicle 100 is parked.

FIG. 4B shows the retractable telescopic steering column 400 in a fully extended position. In this position, the distal ends of the telescoping column sections 408b and 408c overlap the proximal ends of the telescoping column sections 408a and 408b, and the extendable housing member 404b is also extended, so that the distal end thereof overlaps with the proximal end of the stationary housing member 404a. In some embodiments, the extendable housing member 404b is connected to the telescoping column section 408c, so that extension of one causes extension of the other. In such embodiments, the extendable housing member 404b may include one or more features to prevent overextension thereof with respect to the stationary housing member 404a, so that such features are not needed on the telescoping column sections 408a, 408b, and 408c. Also in some embodiments, the telescoping column section 408c is rotatably supported within the extendable housing member 404b (e.g., with a bearing) so as to provided sufficient support to the telescoping column sections 408b and 408c in their fully extended position (e.g., to prevent the fully extended retractable telescopic steering column 400 from bending or sagging).

Although the retractable telescopic steering columns 300 and 400 are shown with three telescoping column sections each, embodiments of the present disclosure encompass the use of more or fewer telescoping column sections. The inclusion of more telescoping column sections typically results in a greater overall diameter of the retractable telescopic steering column, but allows for extension over a longer distance (possibly exceeding 300 mm) or for extension over the same distance but with shorter telescoping column sections.

Figure 5:
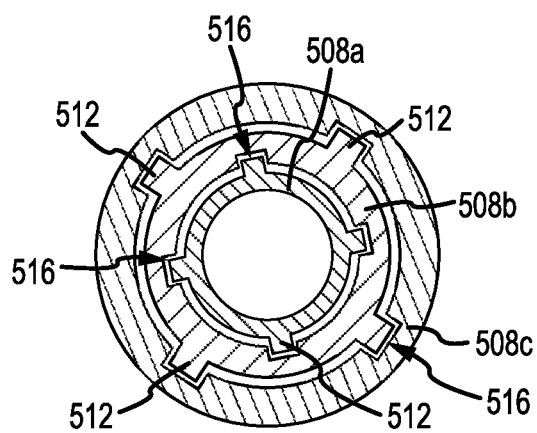
FIG. 5 depicts a cross-section of a telescoping steering column according to another embodiment of the present disclosure.
Figure 6:
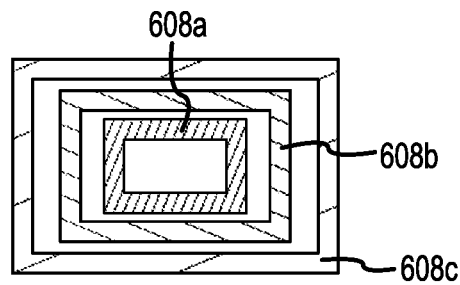
FIG. 6 depicts a cross-section of a telescoping steering column according to another embodiment of the present disclosure.
Figure 7:
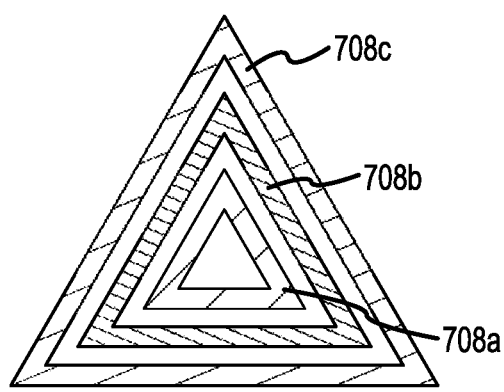
FIG. 7 depicts a cross-section of a telescoping steering column according to another embodiment of the present disclosure.

FIGS. 5-7 provide a cross-sectional view taken perpendicular to the axis of a set of telescoping column sections according to embodiments of the present disclosure, such as the telescoping column sections 308a, 308b, and 308c, and the telescoping column sections 408a, 408b, and 408c. Such telescoping column sections may have any desired shape. In one embodiment, a set of telescoping column sections 508a, 508b, and 508c may be generally circular in shape, as shown in FIG. 5, with interlocking splines 512 and slots 516 provided on the surfaces thereof to ensure that a rotational force applied to one of the telescoping column sections is transmitted to the other telescoping column sections. Non-circular shapes, such as the telescoping column sections 608a, 608b, and 608c of FIG. 6 having a rectangular cross-section, and the telescoping column sections 708a, 708b, and 708c of FIG. 7 having a triangular cross-section, do not need splines or slots for transmitting rotational force, although they may also include splines and slots (or other features) for preventing overextension thereof. Although FIGS. 5-7 depict telescoping column sections having circular, rectangular, and triangular cross-sections, any other desired cross-sectional shape may also be used within the scope of the present disclosure.

Figure 8:
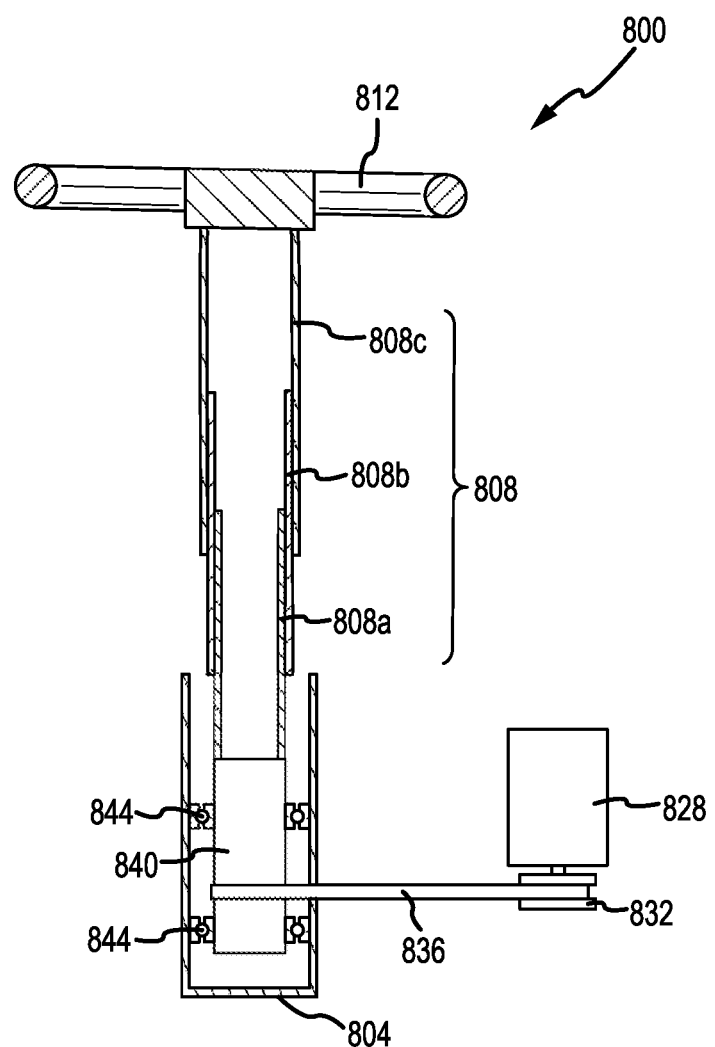
FIG. 8 depicts a telescoping steering column according to another embodiment of the present disclosure.

Referring now to FIG. 8, a retractable telescopic steering column 800 according to another embodiment of the present disclosure comprises a rotationally fixed housing 804 in which a connecting cylinder 840 is rotatably supported via one or more bearings 844. A telescoping column section 808a is fixedly attached to the connecting cylinder 840, and slidably engaged with or attached to the telescoping column section 808b, which in turn is slidably engaged with or attached to the telescoping column section 808c, which in turn is fixedly connected to a steering wheel 812. In some embodiments, the rotationally fixed housing 804 may be pivotable, so that an angle between the telescoping column 808 and a horizontal plane may be selectively adjusted (e.g., to adjust the height of the steering wheel relative to a driver of the vehicle 100). Also in some embodiments, the rotationally fixed housing 804 may be selectively vertically adjustable, so as to move the housing 804—together with the telescoping column sections 808a, 808b, and 808c, and the steering wheel 812—up and down according to the preference of a user of the vehicle (when the telescoping column sections 808a, 808b, and 808c are fully extended) or to better stow the steering wheel 812 (when the telescoping column sections 808a, 808b, and 808c are fully retracted).

Also shown in FIG. 8 is a feedback motor 828, which is fixedly mounted in a position that is offset from the axis of the retractable telescopic steering column 800. The feedback motor 828 drives a belt pulley 832, which is in force transmitting communication with the connecting cylinder 840 via a belt 836. The housing 804 comprises an opening or aperture through which the belt 836 extends between the connecting cylinder 840 and the belt pulley 832. Similar to the operation of the feedback motor 428, the feedback motor 828 exerts (via the belt) a rotational force on the connecting cylinder 840, which is transmitted through the telescoping column sections 808a, 808b and 808c to the steering wheel 812. A controller (not shown) controls the operation of the feedback motor 828, and is configured to cause the feedback motor 828 to transmit to the user of the steering wheel 812 forces that are the same as or similar to the forces the user would feel if the steering wheel 812 were connected to the road wheels 112 of the vehicle 100 via a mechanical linkage, rather than controlling the road wheels 112 via a steer-by-wire system. The controller may determine the timing, direction (e.g., clockwise or counterclockwise), and/or magnitude of forces to cause the motor 828 to exert on the connecting cylinder 840 and thus on the steering wheel 812 (via the telescoping column sections 808a, 808b, and 808c) based on one or more of internal programming; information about the speed of the vehicle 100; information about the user's movement of the steering wheel 812 (which may be the same information input to the steer-by-wire system); information about the movement of the road wheels 112 of the vehicle 100, whether due to the user's manipulation of the steering wheel 812 or due to external forces (e.g., forces caused by hitting a pothole or a speedbump); and/or information about the amount of force that the steer-by-wire system must cause or is causing to be applied to the road wheels 112 to turn them in a desired direction. Other factors may also be considered or utilized to generate realistic force feedback.

Although the feedback motor 828 is depicted in FIG. 8 as driving the connecting cylinder via a belt 836, the feedback motor 828 may be in force-transmitting communication with the connecting cylinder 840 via any suitable mechanism, including via any suitable type of gear or gear assembly.

Figure 9B:
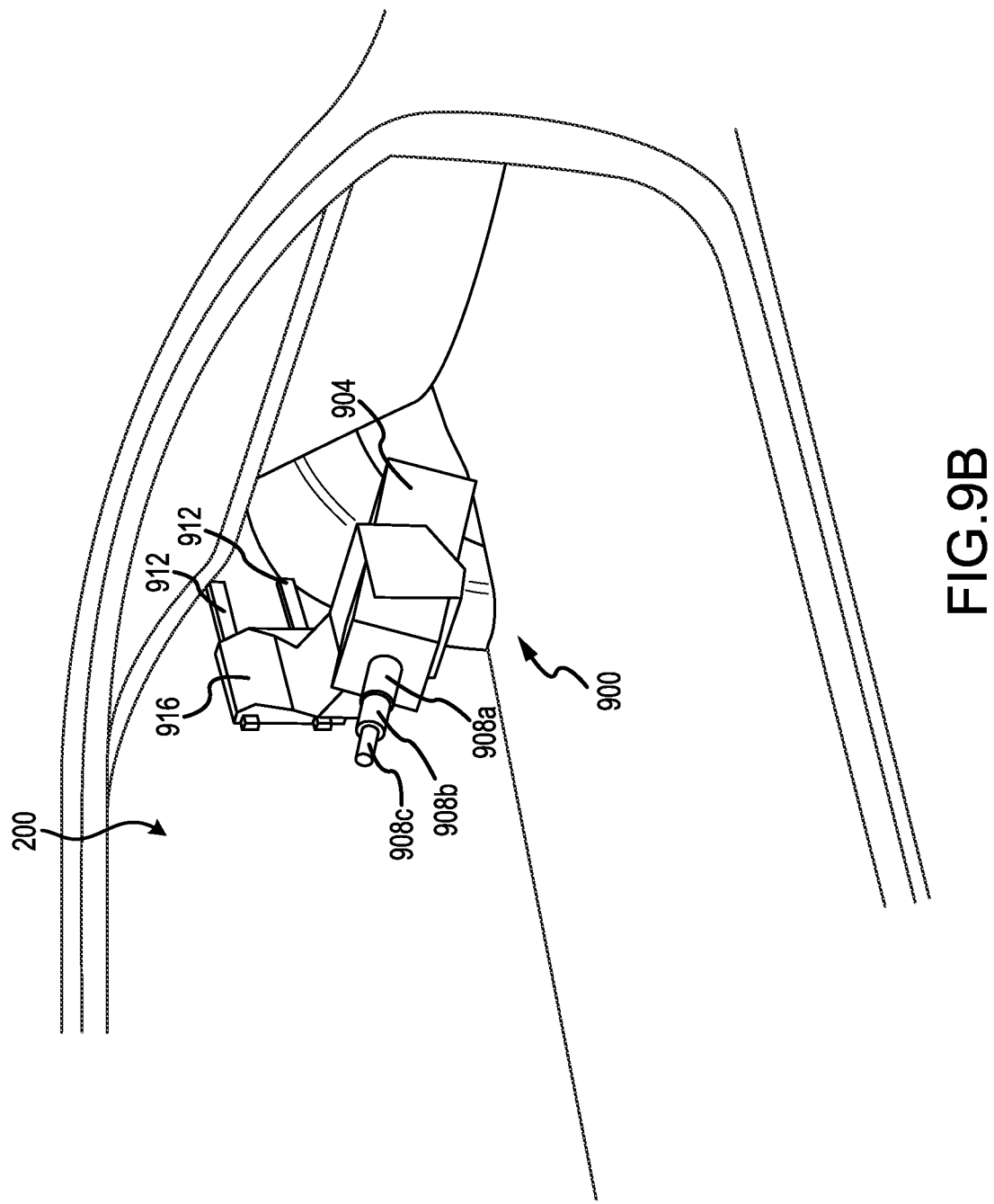
FIG. 9B depicts the body mounted sliding steering column of FIG. 9A in a second position.

Referring now to FIGS. 9A and 9B, in another embodiment of the present disclosure a body mounted sliding steering column 900 comprises a steering column 908, which in turn comprises telescoping column sections 908a, 908b, and 908c. The steering column 908 is supported by a housing 904 that is mounted to an arm 916. The arm 916 is slidably supported on a plurality of rails 912, which are mounted to the A-frame of the vehicle 100. In other embodiments, the rails 912 may be mounted to the cross-car beam that runs across the front of the passenger cabin 200, or to the floor of the passenger cabin 200.

The housing 904 may be pivotably mounted to the arm 916, and the angle of the housing 904 relative to the arm 916 may be selectively adjusted to properly position a steering wheel of the body mounted sliding steering column 900 in front of a driver of the vehicle 100. The selective adjustment may be accomplished manually by the driver, or automatically. In embodiments allowing for automatic adjustment, the body mounted sliding steering column 900 may comprise an electric motor mechanically linked to the housing 904 and/or to the arm 916 and configured to adjust the angle of the housing 904 relative to the arm 916 when operated. Such an electric motor may be configured to operate in response to the pressing of a button or switch (or through some other manipulation of a user interface) by a driver of the vehicle 100, and/or may be configured to operate under the control of a controller or other processor based on instructions stored in a memory associated with the controller or other processor. For example, a controller or processor may be configured to store in memory the preferred tilt angle of the housing 904 for one or more drivers of the vehicle 100, and may be configured to cause the housing 904 to move to a driver's preferred tilt angle when that driver uses the vehicle 100. Also in such embodiments, the controller may cause the housing 904 to move to a predetermined tilt angle relative to the arm 916 when the body mounted sliding steering column 900 is retracted, to ensure that the body mounted sliding steering column 900 can retract properly.

By virtue of being slidably mounted on the rails 912, the arm 916 can move forward into a use position, where a steering wheel attached to the steering column 908 is within reach of an occupant of the vehicle 100 and may be used by the occupant to steer the vehicle 100. The arm 916 can also slide backward when the steering wheel is not needed, so as to free up space in the passenger cabin 200 and as an implicit indicator that the vehicle 100 is being operated autonomously.

The steering column 908 in the embodiment of FIGS. 9A and 9B also comprises telescoping column sections 908a, 908b, and 908c, which, like the other telescoping column sections described herein, are configured to slidably extend and retract. The use of telescoping column sections 908a, 908b, and 908c increases the amount of available travel of the steering wheel (not shown) in the body mounted sliding steering column 900, and allows the total available travel to be divided between the rails 912 and the telescoping steering column 908. In some embodiments, the rails 912 and the telescoping steering column 908 each allow the body mounted sliding steering column 900 to move about one half of the total available travel distance (which may be, for example, approximately three hundred millimeters (e.g., between 270 mm and 330 mm), while in other embodiments, the telescoping steering column 908 accounts for two-thirds or more of the total available travel, and in still other embodiments the rails 912 account for two-thirds or more of the total available travel. Also in some embodiments, the body mounted sliding steering column 900 may comprise a steering column having a fixed length. In such embodiments, the rails 912 account for the entirety of the total available travel of the body-mounted sliding steering column.

As illustrated in FIGS. 9A-9B, the telescoping column section 908c has a smaller diameter than the telescoping column section 908b, which has a smaller diameter than the telescoping column section 908a. In contrast, the telescoping column sections 308a, 308b, 308c, and the telescoping column sections 408a, 408b, and 408c, have increasing diameters, respectively. Either arrangement may be used in the various embodiments disclosed herein.

Although the body mounted sliding steering column 900 is shown comprising two rails 912, embodiments of the present disclosure may have one or more rails 912. Additionally, although the rails 912 are shown as having a substantially rectangular cross-section, embodiments of the present disclosure may utilize rails having any desired cross section. In particular, in some embodiments a single rail 912 may be utilized, but the single rail 912 may have a larger perimeter than the rails 912 shown in FIG. 9A, and/or may comprise a plurality of extensions or protrusions along its length to increase the strength thereof. Also in some embodiments, the rails 912 may comprise one or more features, such as flanges, splines, or slots, to prevent the arm 916 from sliding over an end and thus off of the rails 912.

Also in some embodiments, the arm 916 may be slidably mounted on a set of vertical rails that are in turn slidably mounted on the horizontal rails 912. In such embodiments, the arm 916 may be moved forward and backward on the horizontal rails 912, but may also be adjusted vertically by moving the arm 916 up or down on the set of vertical rails. In this manner, the steering wheel of the body mounted sliding steering column 900 can be carefully positioned at a desired location within the passenger cabin 200, and may also be carefully positioned out of the way of the occupants of the passenger cabin 200 when the vehicle 100 is operated autonomously. As an alternative to the use of vertical rails, the arm 916 may be hinged or jointed or otherwise comprise a plurality of sections, which may be configured to move up or down relatively to each other so as to better position the steering wheel in the passenger cabin 200 (for use by a vehicle occupant) or along the sides of or completely outside of the passenger cabin 200 (when the vehicle is operated autonomously).

In some embodiments, the body mounted sliding steering column 900 is configured to retract the steering wheel by sliding the arm 916 toward the front of the vehicle 100 along the rails 912 and by retracting the telescoping column sections 908c, 908b, and 908a (to the extent section 908a is movable) when the vehicle 100 is placed in park, and/or when the vehicle 100 is powered off. This allows existing or would-be occupants of the vehicle 100 to exit or enter, respectively, more easily, as they do not have to contort their bodies to avoid a steering wheel extending into the passenger cabin 200.

Also in some embodiments, the body mounted sliding steering column 900 may be configured to completely remove a steering wheel of the body mounted sliding steering column 900 from the passenger cabin 200. In such embodiments, the vehicle 100 may comprise a compartment forward of the passenger cabin 200 into which the body mounted sliding steering column 900 may retract when not in use. Such a compartment may or may not have one or more retractable or otherwise movable doors that can be opened when the body mounted sliding steering column 900 is retracted or extended, and that close to obscure the interior of the compartment from the view of those in the passenger cabin 200 when the steering column 900 is in an extended or retracted position.

Figure 10A:
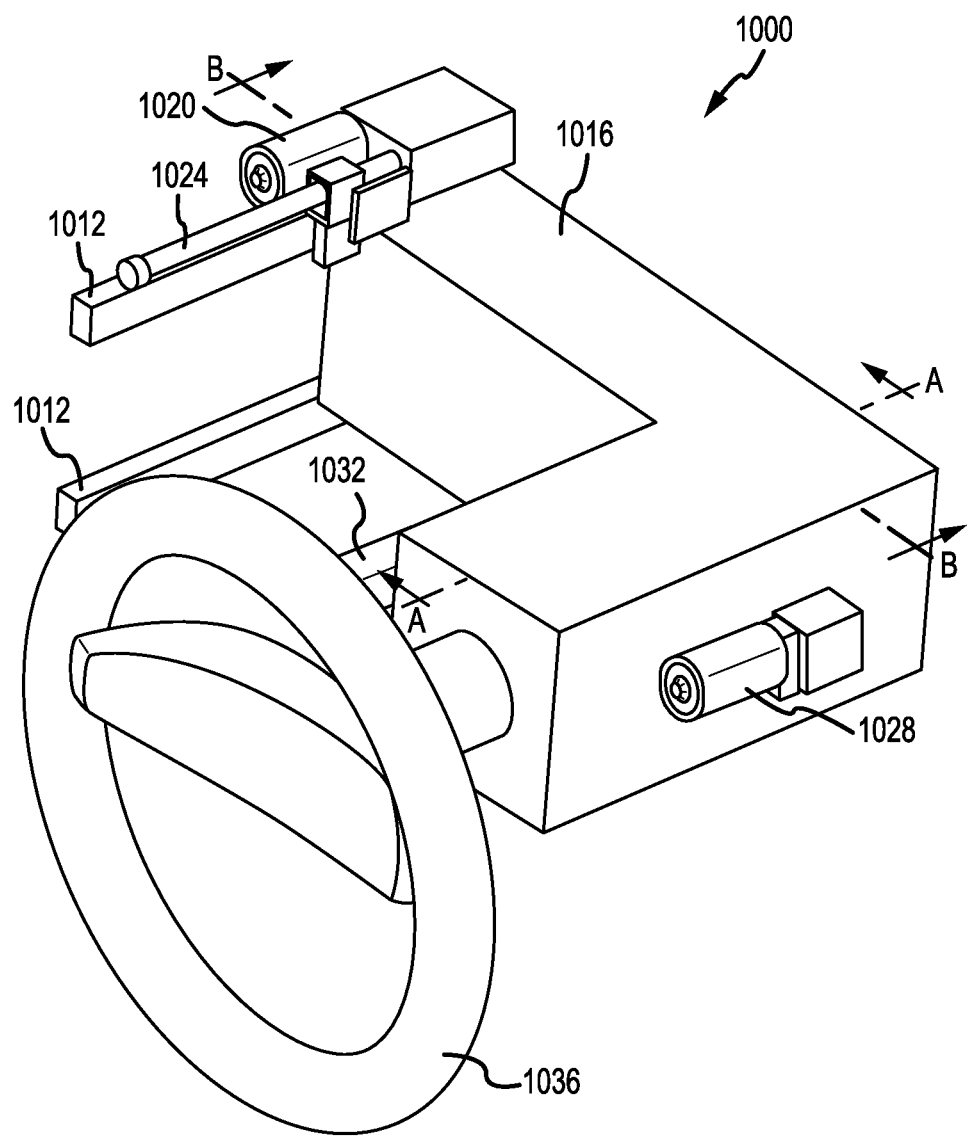
FIG. 10A depicts a body mounted sliding steering column according to another embodiment of the present disclosure.
Figure 10B:
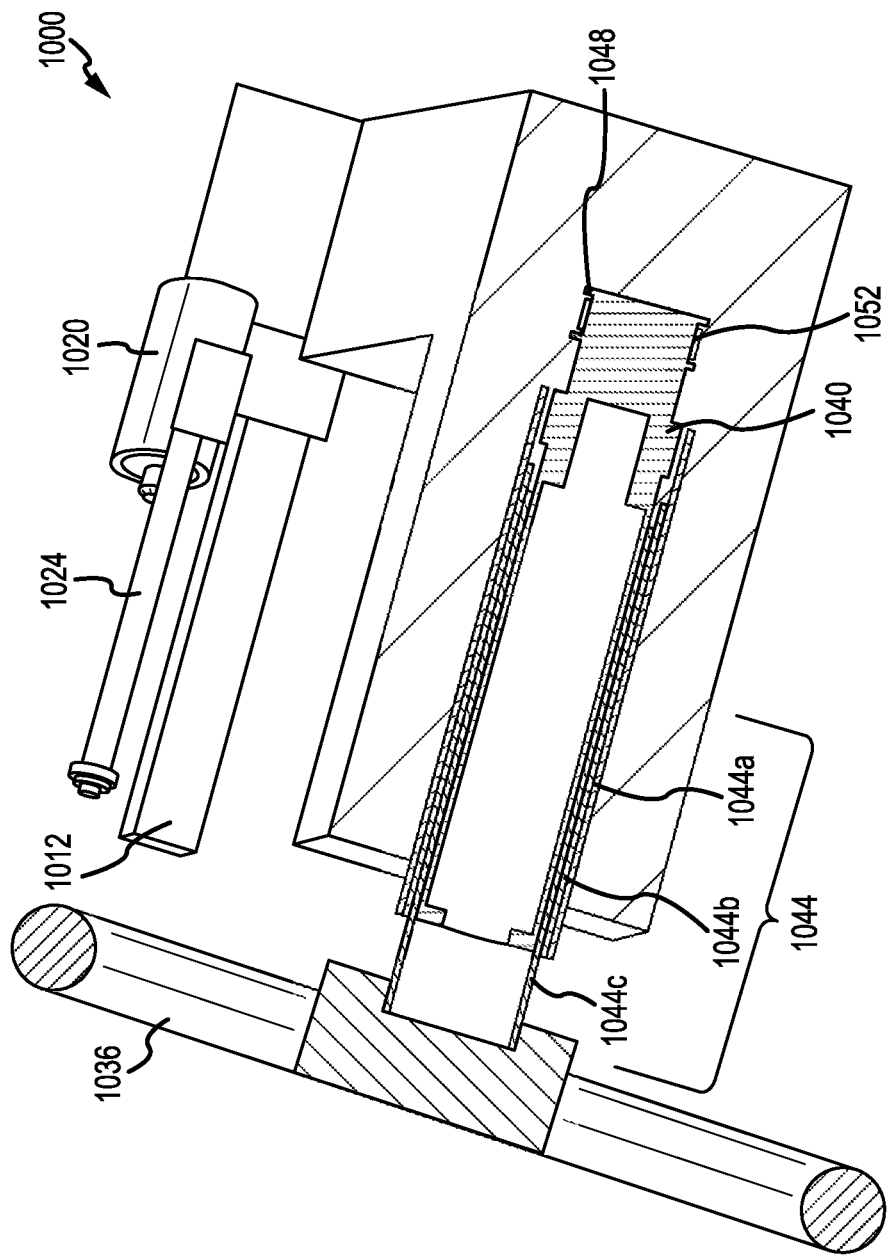
FIG. 10B depicts a cross-section of the body mounted sliding steering column of FIG. 10A along the line A-A.

Referring now to FIGS. 10A-10C, a body mounted sliding steering column 1000 comprises a steering wheel 1036 mounted via a telescoping steering column 1044 to an arm 1016, which is in turn slidably mounted to two rails 1012. Embodiments of the present disclosure encompass the use of one or more rails 1012 for mounting an arm 1016. A motor 1020 is provided for automatically sliding the arm 1016 forward and backward on the rails 1012. A lead screw or linear screw 1024 is provided parallel to the rails 1012. By rotating (whether directly or indirectly) a gear or nut threaded onto the lead screw 1024, or by rotating the lead screw 1024 itself, the motor 1020 causes the arm 1016 to slide along the rails 1012. The direction in which the arm 1016 is caused to slide along the rails 1012 may be reversed by, for example, reversing the polarity of the electric motor, so that it turns in the opposite direction.

Two other motors are illustrated in FIG. 10A. The motor 1028 is configured to extend and retract the telescoping steering column 1044, which is shown in FIG. 10B. The motor 1028 may utilize mechanical linkages to extend and retract the telescoping steering column 1044, or the motor 1028 may be configured to turn a hydraulic or pneumatic pump as part of a hydraulic or pneumatic extension and retraction system.

The motor 1032 is configured to adjust the tilt of the telescoping steering column 1044. The motor 1032 may be configured to adjust the tilt of the steering column 1044 relative to the arm 1016, or the motor 1032 may be configured to adjust the tilt of the steering column 1044 and/or a portion of the arm 1016 (e.g., if the arm 1016 is jointed) relative to a remaining portion of the arm 1016. The motor 1032 may utilize any suitable mechanical linkage for making the angle adjustment. Further, the motor 1032 may be controllable by a driver or other occupant of the vehicle 100 via a button, switch, or other user interface, and/or the motor 1032 may be controllable by a controller or processor configured to execute instructions stored in a memory. The motor 1032 may, for example, operate in a manner that is the same as or similar to the electric motor described above with respect to the body mounted sliding steering column 900 for adjusting the angle of the telescopic steering column 908.

As shown in FIG. 10B, the telescoping steering column 1044 comprises three sections 1044a, 1044b, and 1044c. Unlike the retractable telescopic steering columns 300 and 400 described above, the section 1044c has a smaller diameter than the section 1044b, which has a smaller diameter than the section 1044a. Even so, the operation of the telescoping steering column 1044 is essentially the same as the operation of the telescoping steering columns 300 and 400. In particular, the telescoping sections 1044a, 1044b, and 1044c are slidably engaged with or mounted relative to each other, but are rotationally fixed relative to each other. In this manner, rotation of the steering wheel 1036 results in rotation of the entire telescoping steering column 1044, which rotation can be sensed and measured by a steer-by-wire system and used to control motors that turn the road wheels 112 of the vehicle 100. Additionally, by rotationally fixing the telescoping sections 1044a, 1044b, and 1044c relative to each other, the steering column 1044 can be used to transmit feedback forces to the steering wheel 1036 and on to the driver of the vehicle 100.

Due to the ability of the arm 916 to slide the entire steering column 1044 forward and backward along the rails 1012, the amount of travel that must be provided by the telescoping steering column 1044 may be reduced. As a result, the steering column 1044 may be configured to extend the steering wheel from the fully retracted position by a distance that is, for example, less than two hundred and fifty millimeters (250 mm), or less than three hundred millimeters (300 mm). As a result, each section of the telescoping steering column 1044 may be shorter than the corresponding sections of the telescoping steering columns 308 and 408.

Although shown in FIG. 10B as having three sections (1044a, 1044b, and 1044c), the telescoping steering column 1044 may comprise more or less than three sections. The inclusion of more than three sections may allow for shorter (and therefore, in most cases, stronger) sections, although the range in diameter of the sections would most likely be greater than in an embodiment with only three sections. The inclusion of fewer than three sections (e.g., two sections, or a fixed column having only one section) may beneficially reduce parts and maintenance costs, and may be suited for embodiments in which the desired amount of travel is significantly smaller than, for example, three hundred millimeters (300 mm).

The steering column 1044 may be mounted to the arm 1016 by way of a connecting cylinder 1044, to which the telescoping section 1044a is fixedly or slidably mounted. The connecting cylinder 1040 comprises a belt pulley 1048 at a free end thereof, which belt pulley 1048 receives a belt 1052 that is in mechanical communication with a feedback motor (not shown in FIGS. 10A-10C) connected to a second belt pulley 1056. The use of a belt 1052 to connect the feedback motor to the connecting cylinder 1040 allows the feedback motor to be mounted near the A-frame of the vehicle 100, which in turn frees up space in front of the driver for airbags or other equipment. Additionally or alternatively, mounting the feedback motor near the A-frame reduces the weight of the components positioned at the free end of the arm 1016, and thus reduces both the amount of weight positioned near the driver (which weight could affect the safety of the driver in a collision) and the required strength of the arm 1016 (which must be able to support the weight carried thereby).

As shown in FIG. 10C, a tensioner or idler pulley 1060 may be provided in the arm 1016 for ensuring that the belt 1052 remains properly tensioned.

Although a belt 1052 is shown as providing force-transmitting communication between a force feedback motor positioned in or near the arm 1016 and the connecting cylinder 1044, in some embodiments the force feedback motor may be placed in force-transmitting communication with the connecting cylinder 1044 through, for example, a gear assembly or a chain. In some embodiments, the force feedback motor may be mounted closer to, and even adjacent to, the connecting cylinder 1044.

Figure 11:
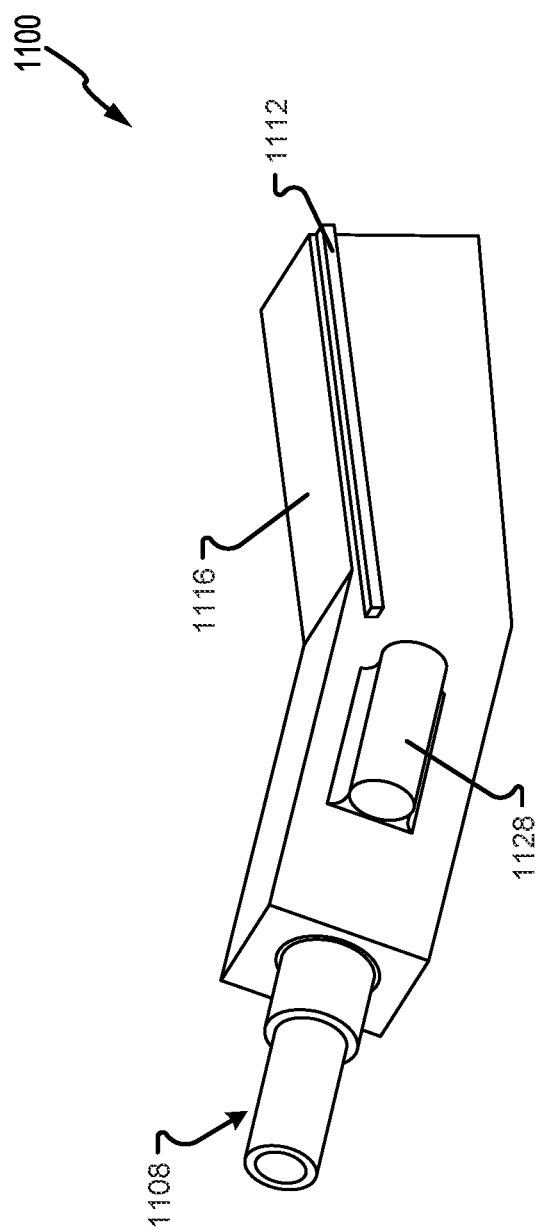
FIG. 11 depicts a body mounted sliding steering column according to yet another embodiment of the present disclosure.

FIG. 11 depicts a body-mounted sliding steering column 1100 according to another embodiment of the present disclosure. The body-mounted sliding steering column 1100 is configured to be slidably connected to a cross-car beam that passes from one side of a vehicle 100 to the other forward of the passenger compartment 200. The body-mounted sliding steering column 1100 comprises a rail 1112 on each side of the arm 1116 (one of which cannot be seen in FIG. 11). The rails 1112 are configured to be slidably received by a track, guide rail, linear bearing, or other feature that is mounted to the cross-car beam, such that the cross-car beam both supports the weight of the body-mounted sliding steering column 1100 and allows the body-mounted sliding steering column 1100 to move forward (out of the way of the passenger compartment 200) and backward (closer to a driver seated in the passenger compartment 200) in the vehicle 100.

The body-mounted sliding steering column 1100 also comprises a telescoping steering column 1108, which may function in the same or in a substantially similar manner as the other telescoping steering columns described herein. The telescoping steering column 1108 is intended to be fixedly attached to a steering wheel (not shown in FIG. 11).

Other features of the body-mounted sliding steering columns described above may also be incorporated into the body-mounted sliding steering column 1100. For example, the body-mounted sliding steering column 1100 may comprise a feedback motor within the arm 1116, which may be in force-transmitting communication with the telescoping steering column 1108 via one or more belts, gears, or other mechanical connections. A motor 1128 may be used to automatically cause the telescoping steering column 1108 to extend and retract, and/or may be used to cause the arm 1116 to slide forward or backward on the rails 1112. The body-mounted sliding steering column 1100 may be configured with an adjustable angle of tilt, so that a driver of a vehicle 100 in which the body-mounted sliding steering column 1100 is installed may tilt a steering wheel attached to the telescoping steering column 1108 up or down, depending on the driver's height and position within the vehicle 100. Based on the foregoing disclosure, a person of ordinary skill in the art will readily understand how to modify the body-mounted sliding steering column 1100 to include one or more of the other features described in the present disclosure.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the steering mechanism(s) for a vehicle. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include a vehicle, comprising: a frame defining a passenger cabin having a front and a back; a plurality of parallel rails mounted to the frame near the front of the passenger cabin; and a sliding steering assembly. The sliding steering assembly comprises: an arm having two ends, the first end slidably connected to the plurality of parallel rails and the second end supporting a housing; a steering column extending from the housing; and a steering wheel affixed to an end of the steering column. The vehicle further comprises a force feedback motor configured to selectively exert a rotational force on the steering column.

Aspects of the above vehicle include: the force feedback motor is mounted inside the arm near the first end of the arm, the force feedback motor connected to the steering column via a belt; a tensioner mounted inside the arm between the force feedback motor and the steering column, the tensioner in contact with the belt; the sliding steering assembly is selectively movable on the plurality of parallel rails between a first position and a second position, the first position located farther from the back of the passenger cabin than the second position; the steering column comprises a first section rotatably connected to the arm, a second section slidably engaged with the first section, and a third section slidably engaged with the second section; the steering column is adjustable between a retracted position, in which a distal end of the first section overlaps a distal end of the second section and the distal end of the second section overlaps a distal end of the third section, and an extended position, in which a proximal end of the first section overlaps the distal end of the second section and a proximal end of the second section overlaps the distal end of the third section; the steering wheel is affixed to the proximal end of the third section; the sliding steering assembly further comprises an electric motor configured to selectively adjust the steering column between the retracted position and the extended position; an electric motor configured to selectively move the arm between the first position and the second position; and the sliding steering assembly further comprises an electric motor configured to selectively adjust an angle between the steering column and a horizontal plane.

Embodiments also include a sliding steering column comprising: a plurality of rails connected, in parallel, to a vehicle; and a steering assembly slidably mounted at one end on the plurality of rails. The steering assembly comprises: a telescoping steering column connected to a second end of the steering assembly; a force feedback motor configured to selectively rotate the telescoping steering column; and a steering wheel mounted on a free end of the telescoping steering column.

Aspects of the sliding steering column include: the telescoping steering column comprises a plurality of sections, each of the plurality of sections slidably engaged with another of the plurality of sections; the steering assembly is moveable on the plurality of rails between a first position and a second position, and the telescoping steering column is adjustable between a retracted position and an extended position; each of the plurality of rails is connected, in parallel, to an A-frame of the vehicle; and each of the plurality of rails is connected, in parallel, to a cross-car beam of the vehicle.

Embodiments also include a movable steering apparatus, comprising: an arm having a first end slidably mounted on at least one rail, the at least one rail affixed to an interior surface of a vehicle; a steering column extending from a second end of the arm, the steering column rotatably mounted to the arm; a steering wheel attached to the steering column; and a force feedback motor in force-transmitting communication with the steering column.

Aspects of the movable steering apparatus include: the force feedback motor is in force-transmitting communication with the steering column via a belt; the force feedback motor is mounted proximate the at least one rail; the steering wheel is movable between a first position closer to a perimeter of a passenger cabin of the vehicle and a second position farther from the perimeter of the passenger cabin of the vehicle; and in the first position the steering column is retracted and the arm is located at a first end of the at least one rail, and in the second position the steering column is extended and the arm is located at a second end of the at least one rail, the first end opposite the second end.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A vehicle, comprising:
   a frame defining a passenger cabin having a front and a back, the frame comprising a cross-car beam;
   a steering assembly mounted to the cross-car beam, comprising:
      a steering column extending from a housing, the steering column configured to telescopically extend or retract from the housing; and
      a steering wheel affixed to an end of the steering column; and
   a force feedback motor configured to selectively exert a rotational force on the steering column around an axis of rotation that extends in a same direction as a longitudinal axis of the steering column.

2. The vehicle of claim 1, further comprising:
   a plurality of parallel rails mounted to the cross-car beam, wherein the steering assembly further comprises an arm having a first end slidably connected to the plurality of parallel rails and a second end supporting the housing,
   wherein the steering assembly is selectively movable on the plurality of parallel rails between a first position and a second position, the first position located farther from the back of the passenger cabin than the second position.

3. The vehicle of claim 2, wherein the force feedback motor is mounted inside the arm near the first end of the arm, the force feedback motor connected to the steering column via a belt.

4. The vehicle of claim 3, further comprising a tensioner mounted inside the arm between the force feedback motor and the steering column, the tensioner in contact with the belt.

5. The vehicle of claim 2, wherein the steering column comprises a first section rotatably connected to the arm, a second section slidably engaged with the first section, and a third section slidably engaged with the second section.

6. The vehicle of claim 5, wherein the steering column is adjustable between a retracted position, in which a distal end of the first section overlaps a distal end of the second section and the distal end of the second section overlaps a distal end of the third section, and an extended position, in which a proximal end of the first section overlaps the distal end of the second section and a proximal end of the second section overlaps the distal end of the third section.

7. The vehicle of claim 6, wherein the steering wheel is affixed to the proximal end of the third section.

8. The vehicle of claim 1, wherein the steering assembly further comprises an electric motor configured to selectively cause the steering column to telescopically extend or retract from the housing.

9. The vehicle of claim 2, further comprising an electric motor configured to selectively move the arm between a first position and a second position on the plurality of parallel rails.

10. The vehicle of claim 1, wherein the steering assembly further comprises an electric motor configured to selectively adjust an angle between the steering column and a horizontal plane.

11. A sliding steering column comprising:
    a steering assembly comprising:
       a telescoping steering column;
       a force feedback motor configured to selectively rotate the telescoping steering column around an axis of rotation that extends in a same direction as a longitudinal axis of the telescoping steering column; and
       a steering wheel mounted on a free end of the telescoping steering column.

12. The sliding steering column of claim 11, wherein the telescoping steering column comprises a plurality of sections, each of the plurality of sections slidably engaged with another of the plurality of sections.

13. The sliding steering column of claim 11, wherein the steering assembly is selectively moveable on a plurality of rails between a first position and a second position, and the telescoping steering column is selectively adjustable between a retracted position and an extended position.

14. The sliding steering column of claim 13, wherein each of the plurality of rails is connected to an A-frame of a vehicle.

15. The sliding steering column of claim 13, wherein each of the plurality of rails is connected to a cross-car beam of a vehicle.

16. A movable steering apparatus, comprising:
    an arm having a first end slidably mounted on at least one rail, the at least one rail affixed to a cross-car beam of a vehicle;
    a steering column extending from a second end of the arm and comprising a first section rotatably mounted to the arm, a second section slidably engaged with the first section, and a third section slidably engaged with the second section; and
    a steering wheel attached to the steering column.

17. The movable steering apparatus of claim 16, further comprising:
    a force feedback motor in force transmitting communication with the steering column, wherein the force feedback motor is in force-transmitting communication with the steering column via a belt.

18. The movable steering apparatus of claim 17, wherein the force feedback motor is mounted proximate the at least one rail.

19. The movable steering apparatus of claim 16, wherein the steering wheel is movable between a first position closer to a perimeter of a passenger cabin of the vehicle and a second position farther from the perimeter of the passenger cabin of the vehicle.

20. The movable steering apparatus of claim 19, wherein in the first position the steering column is retracted and the arm is located at a first end of the at least one rail, and in the second position the steering column is extended and the arm is located at a second end of the at least one rail, the first end being opposite the second end.

* * * * *